United States Patent Office 2,947,835
Patented Aug. 2, 1960

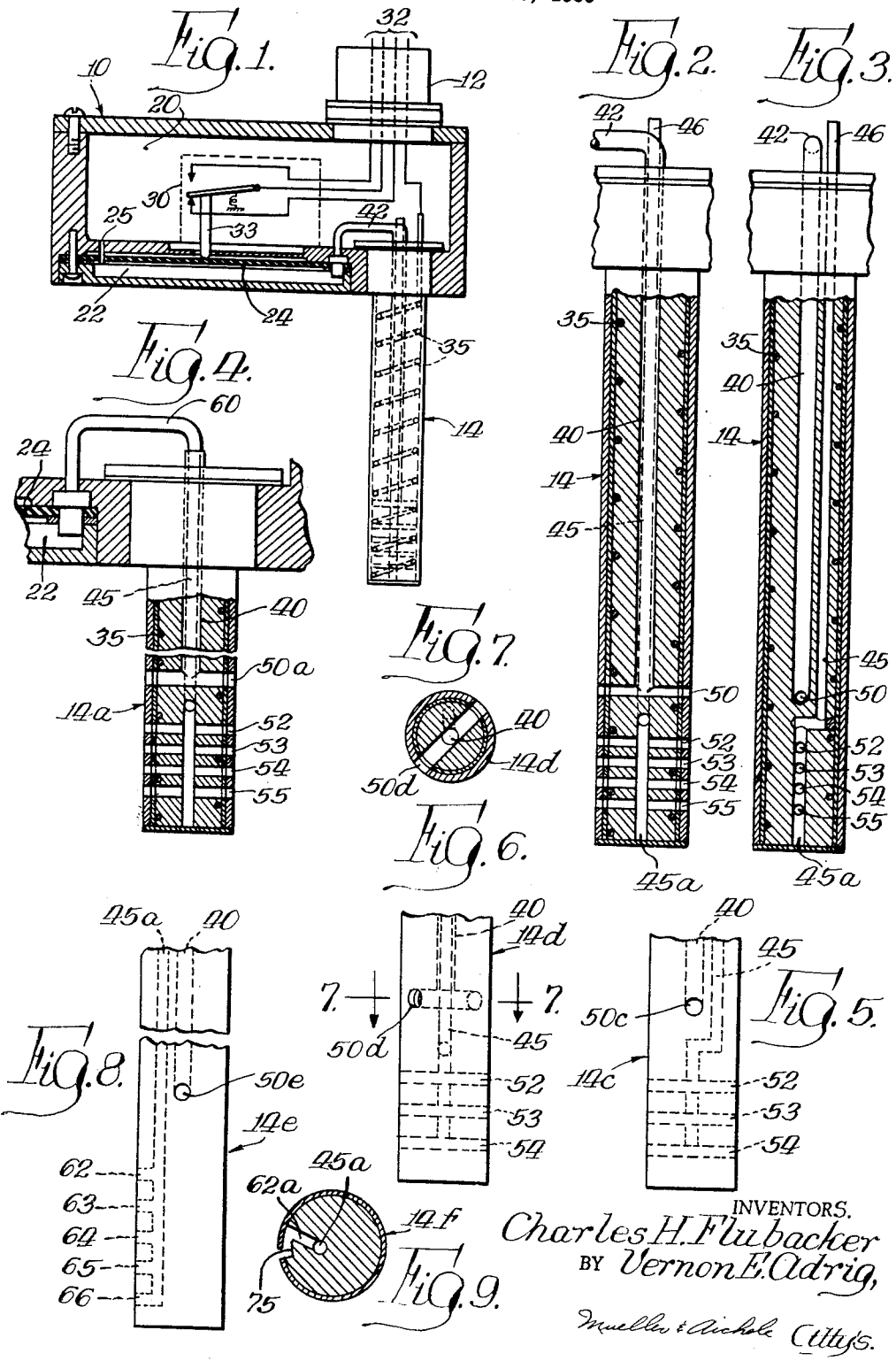

2,947,835
AIRCRAFT ICE DETECTION SYSTEM

Charles H. Flubacker, Barrington, and Vernon E. Adrig, Rolling Meadows, Ill., assignors to Cook Electric Company, Chicago, Ill., a corporation of Delaware Filed Feb. 24, 1959, Ser. No. 795,218

9 Claims. (Cl. 200—83)

This invention relates to ice detecting devices and more particularly to an ice detector useful for sensing an icing condition of aircraft in flight.

In the conventional form of ice detectors for aircraft, a probe is positioned in the air stream of the craft, for example, at the engine air intake port, and the probe includes openings which intercept the airflow to produce an impact pressure in a suitable pressure chamber, which pressure changes upon icing of these openings in the probe. A switch in the device is made operative on such pressure changes to control electrical heating elements used for deicing purposes.

One of the important problems experienced with ice detectors known heretofore has been their susceptability to the back pressure surges of jet engine compressors which are produced by sudden increases in throttling during take-off or in flight maneuvering. These back pressure surges can cause momentary reversals in the direction of airflow across an ice detector probe, thereby building up pressure on the trailing edge of a conventional detector probe and creating an altered airflow which is sensed as an icing condition. In this manner the impact pressure along the leading edge of the probe is absent and the heater apparatus and the deicing equipment are operated. This results in a loss of power at a time when the maximum available power is needed in the craft.

An object of this invention is to overcome the above described difficulty in an ice detector of novel construction.

Another object is to provide an ice detector probe which has reduced response to false ice indicating conditions thereby conserving electric power of the craft in which it is used.

A further object is to provide an ice detector which tolerates air flow reversal across the probe thereof, for example, from the back pressure surges of a jet engine compressor, without giving an icing indication on the circuitry associated with the detector.

A still further object is to provide an ice detector having increased sensitivity to relatively mild icing conditions.

A feature of the invention is a provision of an ice detector having a switch operated by pressure changes in pressure differential chambers and wherein the chambers are respectively coupled to ice detecting apertures in a probe and to a reference aperture through the probe, which reference aperture is oriented to give no pressure change in the chambers which is sufficient to cause operation of the switch upon reversal of the airflow across the detector probe.

Another feature is the provision of such an ice detector probe wherein the reference and ice detector apertures extend through the detector probe so that a relative pressure difference created by forward airflow across the probe continues to be effective upon airflow reversal.

A further feature is the provision of an ice detector probe having a reference aperture transverse to the forward and reverse airflow thereacross in order to aid in detection of frontal as well as lateral icing conditions by the detector device.

An additional feature is the provision of an ice detector probe having detector apertures which are offset to facilitate blocking by rime or knife ice to be detected.

Further objects, features, and the attending advantages of the invention will be apparent upon consideration of the following description taken in conjunction with the accompanying drawings in which:

Fig. 1 is a sectional view of an ice detector constructed in accordance with the invention;

Figs. 2 and 3 are enlarged sectional views of the detector probe of the device of Fig. 1;

Fig. 4 is a partial sectional view of a modified form of the detector probe;

Fig. 5 is a diagrammatic view of a further modification of the ice detector probe;

Fig. 6 is a diagrammatic view of a further modification of a detector probe;

Fig. 7 is a sectional view of the probe of Fig. 6;

Fig. 8 is a diagrammatic view of a still further modification of the ice detector probe of the invention, and Fig. 9 is a sectional view of another modification of the ice detector probe.

In a specific form, the invention provides an ice detector having pressure chambers separated by a diaphragm which is flexed by pressure differences in the chambers in order to operate a switch for controlling electrical heating circuits. A detector probe is adapted to be positioned in the air stream of the craft in which the device is used and this probe has air passages communicating with the pressure chambers and apertures joined to the passages. One aperture extending through the probe and having a linear axis is a reference aperture for developing a reduced pressure in the associated pressure chamber during airflow around the probe. One or more detector apertures communicate with another air passage in the probe and with another of the pressure chambers. Upon icing of the detector apertures, the pressure in the associated chamber is changed sufficiently to cause movement of the diaphragm and actuation of the switch. The reference aperture is symmetrically placed with respect to forward and reverse airflow across the detector probe and thus the reference pressure can be developed so that it does not change sufficiently upon reversal of the airflow to cause operation of the control switch. In modifications of the detector probe the detector apertures can be constructed so that the pressure caused thereby is also essentially unchanged upon reversal of the airflow and the apertures of the probe can be oriented along the direction of the airflow to sense frontal icing conditions or these apertures can be oriented at an angle with respect to the forward airflow to also detect lateral icing conditions. The detector apertures may also be constructed with an offset to assist in accumulating rime ice.

Referring now to the drawing, in Fig. 1 the ice detector 10 includes a fitting 12 which is used for mounting the device with the detector probe 14 in the air stream of an aircraft. The detector includes an upper chamber 20 and a lower chamber 22 which are separated by a flexible diaphragm 24. There is a small bleed hole 25 which extends between the chambers 20 and 22 to assist in equalizing the pressure in the chambers when the probe is iced.

A control switch 30 includes an actuating member 33 which is operated by the diaphragm 24. The switch 30 is illustrated as a single pole, double throw switch, which is spring biased to the positions shown, and various leads 32 are connected to this switch and extend through the coupling 12 to be connected to circuits controlled by the ice detector device. It will be understood that these circuits will include various heating elements and indicator devices and the like. One of the heating elements which is operated by the device when an icing condition is sensed, is the heating element 35 which may be spirally wound within probe 14. This element is connected between the metallic frame of the ice detector device and one of the leads 32 and is energized when an icing condition is sensed in order to deice the probe. A heating element of this type is described and claimed in Flubacker Patent No. 2,775,678 issued December 25, 1956, and assigned to the assignee of the present invention.

Figs. 2 and 3 show in greater detail sectional views of the probe 14. The elongated probe includes a longitudinal central air passage 40 which communicates with the lower chamber 22 by means of a tube 42. The probe also includes a longitudinal air passage 45 which communicates with the upper chamber 20 by means of tube 46.

A reference aperture 50 extends transversely through the probe 14 and communicates with the air passage 40. The aperture 50 has a linear axis and is spaced somewhat from the end of the probe. Passage 40 terminates at the aperture 50. The air passage 45 is offset within the probe as shown in Fig. 3 to form passage 45a in order to clear the passage 40 and aperture 50. Passage 45a continues down the center of the probe. A series of four detector apertures 52–55 extend transversely though the probe and intersect the passage 45a. These apertures are equally spaced and have central axes which are parallel to the axis of the reference aperture 50.

When the device is in use, the probe 14 is oriented so that the direction of normal, or forward, air flow is from left to right in Fig. 2 which is parallel to the linear axes of reference aperture 50 and detector apertures 52–55. As a result of this airflow carried by reference aperture 50, there will be a reduced pressure in the passage 40 and thus a reduced pressure in the chamber 22. Similarly due to airflow through apertures 52–55 there will be a somewhat reduced pressure in the passage 45 and therefore in chamber 20. However, the pressure in the passage 45 will not be as low or as "negative" as that in the passage 40 since each of the successive detector apertures along the probe will tend to decrease the pressure reducing effect of the previous detector aperture. The net result therefore is a pressure difference between the chambers 20 and 22, with that in chamber 22 being more negative than that in chamber 20, thereby flexing the diaphragm 24 downwardly so that switch 30 remains spring biased in the unoperated position shown.

When ice forms over the reference and/or detector apertures 52–55 the airflow through these apertures ceases and airflow around the probe then produces substantially equal negative pressures in the passages 40 and 45, probably on account of the vacuum effect at the trailing edge of the probe where the apertures remain unblocked. At such time the bleed passage 25 assists in equalizing the pressure in the chambers 20 and 22 and diaphragm 24 will be flexed upwardly to cause snap operation of the switch 30 to a different position. In this position of the switch suitable deicing equipment is operated, and heating element 35 is energized to deice the detector probe. If the icing conditions still exist, the cycling will continue as the detector probe alternately detects an icing condition and is cleared in preparation for further detection.

If the airflow were to reverse, that is if the flow were from right to left in Fig. 2, the pressure difference between chambers 20 and 22 would remain substantially the same since the reference aperture 50 and detector apertures 52–55 present the same opening configurations in the leading edge of the probe as they do in the trailing edge of the probe. Accordingly, when the probe 14 is mounted in the air stream at the intake port of a jet engine a back pressure surge of the engine compressors caused, for example, by a sudden increase in throttling, will not result in the false sensing of an icing condition by the ice detector.

Fig. 4 shows a modification of the invention in which the detector aperture 50a is made larger in diameter than the detector apertures 52–55. The coupling to the chambers 20 and 22 is also reversed so that passage 40 opens into the chamber 20 and passage 45 communicates with the chamber 22 by means of the tube 60. Therefore the operation of the switch 30 will be reversed. More specifically with forward airflow across the probe 14a a greatly reduced or negative pressure is formed in the passage 40 thereby reducing the pressure in the chamber 20. A slightly reduced or less negative pressure is produced in the passage 45 and therefore in the chamber 22. In this condition the diaphragm 24 will be flexed upwardly to move switch 30 to its upward position. Obviously the circuit connections to the switch 30 and its spring biasing would be reversed so that this position of the switch would be associated with a no-icing condition.

When ice forms on the leading edge of the probe 14a, the detector apertures 52–55 will be blocked and the pressure in passage 45 will be reduced or rendered more negative, thus changing the pressure balance between the chambers 20 and 22 and causing downward movement of the diaphragm and operation of switch 30 to its downward position. In this position of the switch the deicing elements will be operative to function as previously described. Airflow reversal will not cause operation of the detector switch for the same reasons given in the previous explanations.

In the embodiment of Fig. 5 the probe 14c includes the detector apertures 52–54 which communicate with passage 45. However, the reference aperture 50c has a linear axis which is at right angles to the axes of the detector apertures 52–54. The aperture 50c communicates with the passage 40. In this embodiment it is contemplated that the forward airflow will be from left to right in Fig. 5, that is parallel to the axes of the detector apertures. The airflow of increased velocity around the probe at the ends of aperture 50c which intersect the surface of the probe, will cause greatly reduced pressure in the passage 40 due to a vacuum effect at the ends of this aperture. The airflow through detector apertures 52–54 will cause a reduced pressure, but one which is not as negative as that produced in passage 40 because the successive apertures decrease the pressure reducing effect of the preceding apertures. As in the previous embodiments the passages 40 and 45 may be connected to the pressure chambers 20 and 22 for operation of the switch 30, and a heating element may be included in the probe.

When frontal ice blocks the detector apertures 52–54 the pressure in passage 45, and thus that produced in its associated chamber, will be decreased. The device is designed so that such pressure change will cause operation of the switch 30. In this form, lateral icing of the detector probe can cause closure of the ends of aperture 50c so that the greatly reduced pressure will no longer be produced in passage 40. Since this form of the detector operates to indicate an icing condition on a pressure in passage 40 which is greater than that in passage 45, the increase in pressure in passage 40 caused by lateral icing will operate the detector and energize the deicing apparatus.

It should be noted that in the embodiment of Fig. 5 a reversal of airflow, that is airflow from right to left across the probe as it is shown, will influence the detector and reference apertures in the same way so that the liklihood that a change of pressure differential sufficient to produce a false icing indication is minimized. Accordingly, this embodiment is also insensitive to airflow reversal.

The form of the detector probe shown in Figs. 6 and 7 is a modification of that shown in Fig. 5. In this form the detector apertures 52–54 are as previously described. However, the reference aperture 50d has the linear axis thereof turned so that it is less than 90° with respect to the axes of the detector apertures and less than 90° with respect to the direction of forward and reverse airflow, which would be from left to right and right to left respectively in Fig. 6. This form of the probe would operate in the same way as a probe shown in Fig. 5. However, with the reference aperture at an oblique angle with respect to the airflow this aperture can be useful in sensing a combination of frontal and lateral ice. In other words where the aperture 50c of Fig. 5 is useful in sensing lateral ice the aperture 50d can be clogged by both lateral and frontal ice. Blocking from lateral ice would cause operation comparable to that described in connection with Fig. 5. Blocking of aperture of 50d by frontal ice would cause operation of the device similar to that described in Figs. 1–4.

In the embodiment shown in Fig. 8 the probe 14e includes a reference aperture 50e which is shown at right angles to the direction of forward airflow across the probe, this being from left to right in the figure. Reference aperture 50e communicates with the air passage 40. The leading edge of the probe 14e has detector apertures 62—66 which are equally spaced along the longitudinal axis of the probe and communicate with the air passage 45a. The passages 40 and 45a may be connected to associated pressure chambers for operation of switch 30 in accordance with the form of the invention shown either in Fig. 1 or in Fig. 4. A suitable heating element may also be included in this probe.

In the probe 14e of Fig. 8 the detector apertures 62—66 extend only part way through the body of the probe so that forward air pressure around the probe, that is from left to right in Fig. 8, will establish a positive impact pressure in the passage 45a. There will be a greatly reduced pressure in the passage 40 due to the vacuum effect of the airflow passing around the probe at the ends of the reference aperture 50e. The reference aperture 50e corresponds to aperture 50c of the embodiment shown in Fig. 5. The pressure difference established between the passages 40 and 45a may be used to establish a corresponding pressure difference in suitable pressure chambers separated by a diaphragm and this is used to operate a control switch to a position associated with a non-icing condition. When ice blocks either detector apertures 62—66 or the reference aperture 50e (which would be caused by lateral icing) the ensuing pressure change in the associated pressure chambers can be made to operate the switch to energize the associated deicing heating elements.

If the direction of airflow reverses, that is if it flows from right to left in Fig. 8, for example, due to the result of back pressure surges from a jet engine compressor, the air passing around the probe at the ends of the reference aperture 50e will maintain the reduced pressure in the passage 40. While there will be some loss of the positive pressure produced in the passage 45a through the detector apertures, the relationship of the pressure change required for operation of the switch is made such that the switch will not be operated during the compaartively short duration of a back pressure surge since at such time the reduced pressure is maintained in passage 40.

Fig. 9 shows a sectional view of the ice detector probe 14f, having ice detector apertures which are offset. It will be understood that there would be a series of ice detector apertures all similarly constructed and that a reference aperture such as shown in the probes of Figs. 6 or 8 could also be used. In this form the detector apertures such as aperture 62a, extends part way into the body of the probe, is then offset, and extends into communication with the passage 45a. The offset of aperture 62a forms a wall portion 75 which is aligned with the entry of aperture 62a, that is, the construction effectively forms a baffle which extends across the mouth of the opening to be presented to forward air flow. The effective baffle is spaced from the mouth of the opening and is preferably of greater dimension than that of the opening so that ice may accumulate in the offset which is not aligned with the forward air flow.

With the detector apertures constructed in the particular manner shown in Fig. 9, it is possible for the ice to be detected due to the accumulation thereof on the back wall 75 and the closure of aperture 62a across the offset portion thereof. This type of construction assists in the detection of so-called rime or knife ice. Since the build up of ice to block the detector apertures is somewhat slow during icing conditions of the type, and since such ice may be somewhat porous, the modification may be used to improve the blocking of the detector apertures and the overall ice detector sensitivity.

The invention provides therefore an ice detector device having a detector probe which tolerates airflow reversal thereacross without operating the device to give a false icing indication. While certain specific embodiments of the invention have been shown and described it should be obvious that certain variations could be made in the device without departing from the scope of the invention. For example, the shape of the probe can be varied, and, to the extent that design requirements for the desired operating characteristics will permit, the shape, number, size and angular orientation of the apertures in the probe can be varied.

We claim:

1. In an ice detecting device having first and second pressure chambers and switch means operable by a given pressure differential in the chambers to operate an electric circuit, an ice detecting probe adapted to be positioned in an air stream, said probe including an elongated body portion having first and second air passages therein adapted to be coupled respectively to the first and second chambers of the device, said body portion including reference aperture means extending through said body portion and intersecting the surface thereof on opposite sides of said body portion, with the openings in said sides being of substantially the same total area to present a reference aperture structure symmetrical with respect to air flow in opposite directions across said probe said reference aperture means communicating with said first air passage, said body portion further having detector aperture means communicating with said second air passage, so that icing of said aperture means will cause blocking thereof and pressure differential change in the pressure chambers and operation of the switch means.

2. In an ice detecting device having first and second pressure chambers and switch means operable by a given change in the pressure differential in the chambers to operate an electric circuit, an ice detecting probe adapted to be positioned in an air stream, said probe including a body portion having first and second air passages therein adapted to be coupled respectively to the first and second chambers of the device, said body portion including reference aperture means extending through said body portion to intersect the surface thereof on opposite sides of said body portion, said reference aperture means communicating with said first air passage and presenting openings of substantially the same area in said sides of said body portion to create substantially the same reduced pressure therein upon both forward and reverse directions of airflow across said body portion, said body portion further having detector aperture means on a surface thereof communicating with said second air passage, said detector aperture means being oriented to face the forward direction of airflow when the device is in use and providing a further pressure in said second air passage greater than said reduced pressure due to such airflow, so that icing of said aperture means will cause a change in the relative pressure in the chambers and operation of the switch means.

3. In an ice detecting device having first and second pressure chambers and switch means operable by a given pressure differential in the chambers to operate an electric circuit, an ice detecting probe adapted to be positioned in an air stream, said probe including a body portion having first and second air passages therein adapted to be coupled respectively to the first and second chambers of the device, said body portion including a first opening having a linear axis and extending through said body portion to intersect substantially equal areas of the surface thereof in two locations, said first opening communicating with said first air passage to create substantially the same reduced pressure therein upon air flow across said body portion in both forward and reverse directions of airflow, said body portion further having aperture means communicating with said second air passage and responsive to the airflow across said body portion in at least the forward direction to produce a further pressure in said second air passage greater than the aforementioned reduced pressure, so that icing of said aperture means will cause reduction of the further pressure for operation of the switch.

4. In an ice detecting device having first and second pressure chambers and switch means operable by a given pressure differential in the chambers to operate an electric circuit, an ice detecting probe adapted to be positioned in an air stream, said probe including an elongated body portion having first and second air passages therein adapted to be coupled respectively to the first and second chambers of the device, said body portion including a reference aperture extending through said body portion along a linear axis and intersecting the surface thereof on opposite sides of said body portion, said reference aperture communicating with said first air passage and presenting openings of substantially the same area in said sides of said body portion thereby providing reduced pressure in the first chamber upon airflow about said body portion in any two opposite directions, said body portion further having a plurality of apertures communicating with said second air passage and providing a pressure greater than the aforementioned reduced pressure upon airflow about said body portion in at least one of the directions, whereby icing of said apertures will cause pressure change in the pressure chambers and operation of the switch means.

5. In an ice detecting device having first and second pressure chambers and switch means operable by a given pressure differential in the chambers to operate an electric circuit, an ice detecting probe adapted to be positioned in an air stream of forward direction and subject to change to a reverse direction, said probe including an elongated body portion having first and second air passages therein adapted to be coupled respectively to the first and second chambers of the device, said body portion including reference aperture means extending through said body portion substantially along the aforesaid forward direction of airflow and intersecting the surface thereof on opposite sides of said body portion, said reference aperture means communicating with said first air passage and presenting openings of substantially the same area in said sides of said body portion, said body portion further having detector aperture means extending into said body portion substantially along the aforesaid forward direction of airflow and communicating with said second air passage, so that icing of said aperture means will cause pressure change in the pressure chambers and operation of the switch means and the airflow of forward and reverse directions produces substantially the same pressure in said first air passage and associated chamber.

6. In an ice detecting device having first and second pressure chambers and switch means operable by a given pressure differential in the chambers to operate an electric circuit, an ice detecting probe adapted to be positioned in an air stream of forward direction and subject to change to a reverse direction, said probe including an elongated body portion having first and second air passages therein adapted to be coupled respectively to the first and second chamber of the device, said body portion including reference aperture means extending through said body portion transverse to the aforesaid forward direction of airflow and intersecting the surface thereof on opposite sides of said body portion, said reference aperture means communicating with said first air passage and presenting openings of substantially the same area in said sides of said body portion, said body portion further having detector aperture means extending into said body portion substantially parallel to the aforesaid forward direction of airflow and communicating with said second air passage, so that icing of said aperture means will cause pressure change in the pressure chambers and operation of the switch means and the airflow of forward and reverse directions produces substantially the same pressure in said first air passage.

7. In an ice detecting device having first and second pressure chambers and switch means operable by a given pressure differential in the chambers to operate an electric circuit, an ice detecting probe having leading and trailing surfaces and adapted to be positioned in an air stream, said probe including an elongated body portion having first and second air passages therein adapted to be coupled respectively to the first and second chambers of the device, said body portion including a reference aperture extending through said body portion at right angles to the leading and trailing surfaces and intersecting the surface thereof on opposite sides of said body portion, said reference aperture communicating with said first air passage and presenting openings of substantially the same area in said sides of said body portion thereby providing reduced pressure in the first chamber upon airflow about said body portion in two opposite directions, said body portion further having a plurality of detector apertures extending between said leading edge and said second air passage to provide a pressure greater than the aforementioned reduced pressure upon airflow about said body portion travelling from the leading surface to the trailing surface, whereby icing of said apertures will cause pressure change in the pressure chambers and operation of the switch means and airflow in the aforesaid opposite direction does not produce a pressure differential to operate the switch means.

8. In an ice detecting device having first and second pressure chambers and switch means operable by a given pressure differential in the chambers to operate an electric circuit, an ice detecting probe having leading and trailing surfaces and adapted to be positioned in an air stream, said probe including an elongated body portion having first and second air passages therein adapted to be coupled respectively to the first and second chambers of the device, said body portion including a reference aperture extending through said body portion along a linear axis and intersecting the surface thereof on opposite sides of said body portion transverse to the leading and trailing surfaces, said reference aperture communicating with said first air passage and presenting openings of substantially the same area in said sides of said body portion thereby providing reduced pressure in the first chamber upon airflow about said body portion in two opposite directions, said body portion further having a plurality of detector apertures in the leading surface thereof and communicating with said second air passage to provide a pressure greater than the aforementioned reduced pressure upon airflow about said body portion in the aforesaid opposite directions, whereby icing of said apertures will cause pressure change in the pressure chambers and operation of the switch means and airflow in the aforesaid opposite directions does not produce a pressure differential to operate the switch means.

9. In an ice detecting device having first and second pressure chambers and switch means operable by a given change in the pressure differential in the chambers to operate an electric circuit, an ice detecting probe adapted to be positioned in an air stream, said probe including a body portion having first and second air passages therein adapted to be coupled respectively to the first and second chambers of the device, said body portion including reference aperture means extending through said body portion to intersect the surface thereof on opposite sides of said body portion, said reference aperture means communicating with said first air passage and presenting openings of substantially the same area in said sides of said body portion to produce substantially the same reduced pressure therein upon both forward and reverse directions of air flow across said body portion, said body portion further having detector aperture means on a surface thereof communicating with said second air passage, said detector aperture means being oriented to face the forward direction of air flow when the device is in use and providing a further pressure in said second air passage greater than said reduced pressure due to the forward air flow, said detector aperture means also including means providing a baffle thereacross to form an offset for air flow therethrough and to promote ice accumulation in said detector aperture means, whereby icing of said aperture means will cause a change in the relative pressure in the chambers and operation of the switch means.

References Cited in the file of this patent

UNITED STATES PATENTS

| | | |
|---|---|---|
| 2,724,106 | Fraser | Nov. 15, 1955 |
| 2,744,992 | Spears | May 8, 1956 |
| 2,775,678 | Flubacker | Dec. 25, 1956 |
| 2,846,555 | Grieger | Aug. 5, 1958 |
| 2,874,259 | Morris | Feb. 17, 1959 |